(12) United States Patent
Geelen

(10) Patent No.: US 8,954,263 B2
(45) Date of Patent: Feb. 10, 2015

(54) PORTABLE NAVIGATION DEVICE

(75) Inventor: Pieter Geelen, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 1298 days.

(21) Appl. No.: 12/318,825

(22) Filed: Jan. 9, 2009

(65) Prior Publication Data

US 2009/0192704 A1 Jul. 30, 2009

Related U.S. Application Data

(62) Division of application No. 11/712,558, filed on Mar. 1, 2007, now abandoned.

(30) Foreign Application Priority Data

| Mar. 8, 2006 | (GB) | 0604704.7 |
| Mar. 8, 2006 | (GB) | 0604706.2 |
| Mar. 8, 2006 | (GB) | 0604708.8 |
| Mar. 8, 2006 | (GB) | 0604709.6 |
| Mar. 8, 2006 | (GB) | 0604710.4 |

(51) Int. Cl.
*G01C 21/00* (2006.01)
*G01C 21/36* (2006.01)
*G09G 3/34* (2006.01)

(52) U.S. Cl.
CPC .......... *G01C 21/36* (2013.01); *G09G 3/3406* (2013.01); *G09G 2360/144* (2013.01)
USPC .......................................... 701/400

(58) Field of Classification Search
None
See application file for complete search history.

(56) References Cited

U.S. PATENT DOCUMENTS

| 4,904,991 | A | | 2/1990 | Jones | |
| 5,337,073 | A | * | 8/1994 | Tsunoda et al. | 345/102 |
| 5,614,788 | A | * | 3/1997 | Mullins et al. | 315/82 |
| 5,760,760 | A | * | 6/1998 | Helms | 345/102 |
| 5,786,801 | A | * | 7/1998 | Ichise | 345/102 |
| 5,796,350 | A | * | 8/1998 | Fuse | 340/815.75 |
| 5,998,929 | A | | 12/1999 | Bechtel et al. | |
| 6,374,079 | B1 | | 4/2002 | Hsu | |
| 6,507,286 | B2 | * | 1/2003 | Weindorf et al. | 340/815.75 |
| 6,556,134 | B2 | * | 4/2003 | Nakaji et al. | 340/461 |
| 6,870,529 | B1 | * | 3/2005 | Davis | 345/207 |
| 6,873,907 | B1 | | 3/2005 | Millington et al. | |

(Continued)

FOREIGN PATENT DOCUMENTS

| EP | 1217598 A | 6/2002 |
| EP | 1596163 A | 11/2005 |

(Continued)

OTHER PUBLICATIONS

XP013013485—No author name supplied in source data, "An ability to automatically control display settings based on the ambient light", ip.com Journal, ip.com Inc., West Henrietta, NY, US, Nov. 18, 2003.

(Continued)

*Primary Examiner* — Bhavesh V Amin

(57) ABSTRACT

A navigation device is configured to allocate display setting such as color schemes and screen contents to at least one ambient lighting condition, monitors and evaluates a signal indicative of ambient lighting conditions and determines whether display settings for the current ambient lighting conditions are already in use and to change display settings so that they suit current ambient lighting conditions if needed.

20 Claims, 5 Drawing Sheets

(56) References Cited

U.S. PATENT DOCUMENTS

| | | |
|---|---|---|
| 6,976,626 B2 | 12/2005 | Schmidt et al. |
| 7,266,455 B2 | 9/2007 | Kahsoska |
| 7,289,393 B2 | 10/2007 | Keller et al. |
| 7,801,676 B2* | 9/2010 | Kurosawa et al. ............ 701/429 |
| 2002/0118182 A1* | 8/2002 | Weindorf ...................... 345/204 |
| 2003/0191623 A1 | 10/2003 | Salmonsen |
| 2003/0208314 A1* | 11/2003 | Funk et al. .................... 701/207 |
| 2004/0001396 A1 | 1/2004 | Keller et al. |
| 2004/0201547 A1* | 10/2004 | Takayama ......................... 345/7 |
| 2005/0261826 A1* | 11/2005 | Kurosawa et al. ............ 701/208 |
| 2006/0155387 A1 | 7/2006 | Pieronek |
| 2006/0206263 A1 | 9/2006 | Cross et al. |
| 2006/0206268 A1 | 9/2006 | Kahkoska |
| 2007/0159005 A1 | 7/2007 | Bourret et al. |
| 2007/0239353 A1 | 10/2007 | Vismans et al. |
| 2007/0266177 A1 | 11/2007 | Vismans et al. |
| 2007/0275733 A1 | 11/2007 | Vismons et al. |
| 2009/0192704 A1* | 7/2009 | Geelen ......................... 701/200 |

FOREIGN PATENT DOCUMENTS

| | | |
|---|---|---|
| JP | 2001215945 A | 8/2001 |
| JP | 2003121158 | 4/2003 |
| JP | 2004320462 A | 11/2004 |
| JP | 2005014782 A | 1/2005 |
| JP | 2005214693 A | 8/2005 |
| WO | 9957521 A | 11/1999 |

OTHER PUBLICATIONS

International Search Report issued Sep. 6, 2007 for International Application No. PCT/EP2007/002149.

International Search Report issued Aug. 29, 2007 for International Application No. PCT/EP2007/002137.

* cited by examiner

PORTABLE NAVIGATION DEVICE

REFERENCE TO RELATED APPLICATIONS

The present application is a divisional and claims priority under 35 USC §120 of pending prior U.S. application Ser. No. 11/712,558 filed on Mar. 1, 2007, which claims priority under 35 U.S.C. §119 to United Kingdom Application Numbers 0604709.6 filed Mar. 8, 2006, 0604708.8 filed Mar. 8, 2006, 0604710.4 filed Mar. 8, 2006, 0604704.7 filed Mar. 8, 2006, and 0604706.2 filed Mar. 8, 2006, the entire contents of each of which are hereby incorporated herein by reference.

BACKGROUND OF THE INVENTION

1. Field of the Invention

The present invention relates to a portable navigation device, including functionality for automatically adjusting display settings to suit various ambient lighting conditions.

2. Description of the Prior Art

Global Positioning System GPS based navigation devices are well known and are widely employed as in-car navigation devices. Reference may be made to devices that integrate a GPS receiver into a computing device programmed with a map database and that can generate navigation instructions on a display, such as the TOMTOM GO device. These portable, integrated devices are often mounted on or in the dashboard of a vehicle using a suction mount or a docking mechanism.

Reference may also be made to the Navigator series software from the present assignee, TomTom International B.V. This software, when running on a Personal Digital Assistant PDA with GPS receiver (such as a COMPAQ IPAQ) or connected to an external GPS receiver, enables a user to input to the PDA a start and destination address. The software then calculates the best route between the two end-points and displays instructions on how to navigate that route.

The term 'navigation device' refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or docked or otherwise used inside a vehicle. Generally (but not necessarily), they are fully self-contained—i.e. include an internal GPS antenna, navigation software and maps and can hence plot and display a route to be taken.

By using the positional information derived from the integrated or external GPS receiver, the software can determine at regular intervals the position of the navigation device or PDA (typically mounted on the dashboard of a vehicle) and can display the current position of the vehicle on a map and display (and speak appropriate navigation instructions (e.g. 'turn left in 100 m') on the screen.

Graphics depicting the actions to be accomplished (e.g. a left arrow indicating a left turn ahead) can be displayed in a status bar and also be superimposed over the applicable junctions/turnings etc in the roads shown in the map itself. The display of the navigation device may consist of a liquid crystal display LCD for showing user location on a map and any information related to surroundings and a planned route. One example is the SAMSUNG LTE400WQ-E01 active matrix LCD module with integrated touch panel and backlight.

The set of colors for displaying a map or showing menu items on the screen of the navigation device might be pre-defined and various sets of colors might be stored as color schemes. The user may also control the backlight level of the display, which might range from full backlight level to switching off backlight completely.

One common approach is for a user to manually change the brightness settings of the display when ambient lights change, e.g. to increase brightness when using the navigation device or PDA under direct sunlight or decrease background illumination in low light situations, e.g. during the night or when driving in a tunnel. In these situations, the default brightness setting might not be appropriate because the display might be either too dark or too bright for the given lighting conditions. Lower backlight levels might also be desired for lower power consumption and an extended battery life.

It is also possible to configure a navigation device or PDA to use pre-defined color schemes for menus, maps and navigation screens. Some color schemes utilize colors with high contrast that remain visible even under direct sunlight, other color schemes are suitable for color-blind persons, and it is also known to utilize color schemes that are more suited for low light environments or when using the navigation device or PDA during the night.

However, it is not known to gradually change display brightness of a portable navigation device depending on current ambient lighting conditions and user selectable options. It is also not possible to make automatic adjustments to display brightness and/or color schemes without user interaction where and when it is most desired.

The present invention provides means for changing display settings to suit current ambient light levels and for providing user selectable preferences for automatic adjustment of display settings when ambient light levels change.

SUMMARY OF THE INVENTION

The invention is a navigation device comprising a processor arranged to monitor signals indicative of ambient lighting conditions and to select display settings allocated to current ambient lighting conditions. The invention is also a method for automatically adjusting display settings of a portable navigation device in accordance to current ambient lighting conditions.

BRIEF DESCRIPTION OF THE DRAWINGS

The present invention will be described with reference to the accompanying drawings, in which.

DETAILED DESCRIPTION OF THE PREFERRED EMBODIMENTS

An embodiment of the present invention will be described below in detail with reference to the accompanying drawings.

Figure 1:
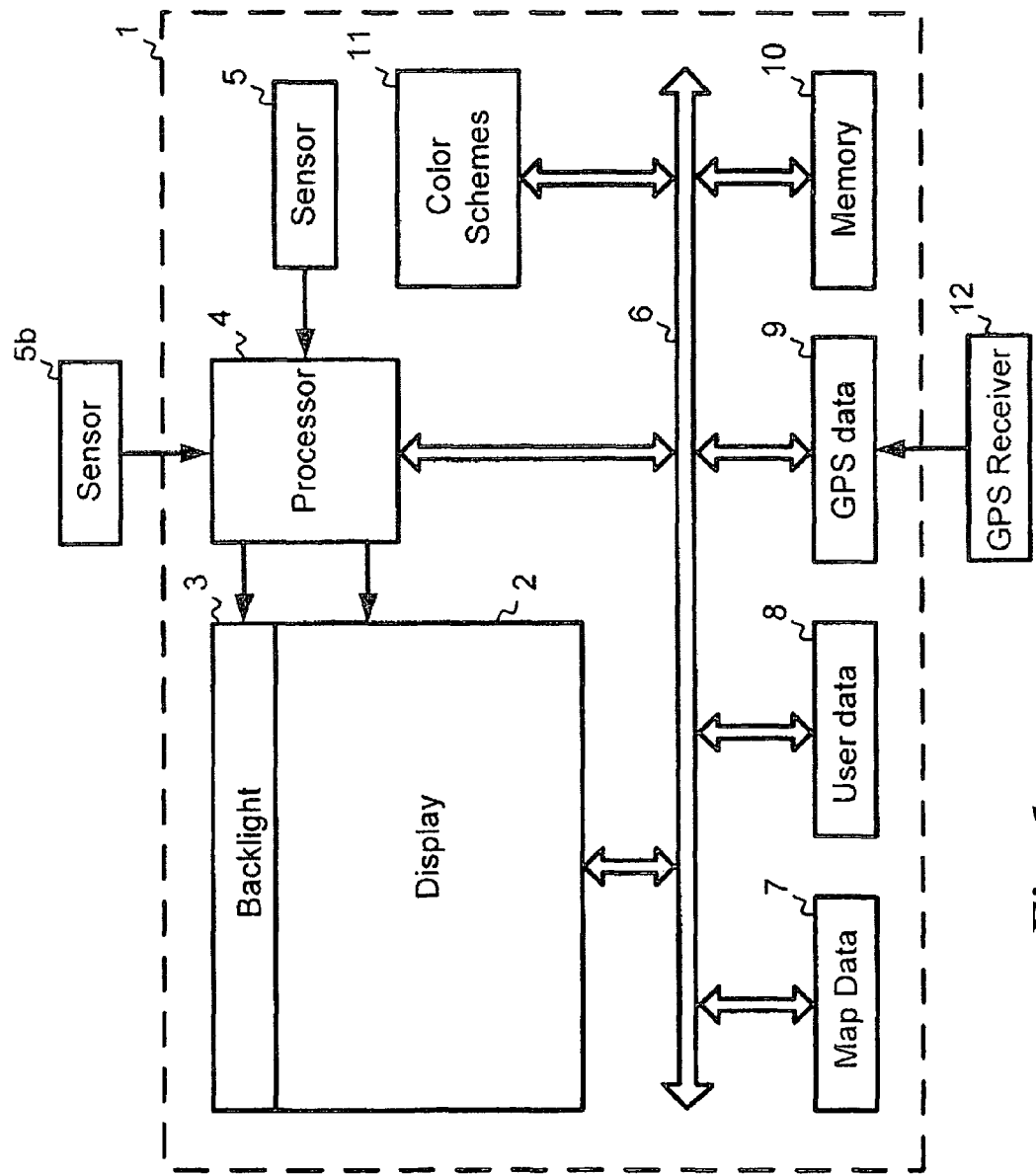
FIG. 1 is a block diagram depicting elements of a navigation device implementing the present invention.

FIG. 1 is a block diagram showing various elements of a navigation device according to the invention. The main components of the navigation device are enclosed in a portable housing 1. The navigation device comprises a memory 10, the type of which might be internal (such as a hard disk flash memory, random access memory, read only memory or similar) or removable (such as a memory card, memory stick, compact disc, digital versatile disc or similar). The navigation device may comprise both internal and removable memories at the same time.

Location of the navigation device is calculated using position (e.g. GPS) data 9 that is obtained from a GPS receiver 12. The GPS receiver 12 might be internal or external, connected to the navigation device with wires or wirelessly.

The navigation device contains a processor 4 for carrying out navigation related tasks according to programmed instructions and user interaction. The processor 4 communicates with various elements of the navigation device through a data bus 6. Map data 7, user data 8, GPS data 9 can be accessed by the processor 4 through the data bus either directly or through other elements that are outside the scope of the present invention.

The navigation device comprises a display 2 showing a map and navigation instructions, and providing user access to various functions of the navigation device via a graphical menu system. The colors and the contents displayed on the screen are controlled by the processor 4 in accordance with the programmed functions, planned route and location of the navigation device. In other implementations, a separate image processor might be utilized for graphical tasks.

The display 2 comprises a light source 3 for backlight. The light source 3 might provide different output levels such as light emitting diodes with pulse width modulation. Backlight levels are controlled by the processor 4 or the separate image processor.

Color schemes 11 are also stored in the memory 10 or in other dedicated areas of the navigation device. A color scheme might be stored as a plug-in file. A plug-in file is a special piece of software that interacts with a main application, in this case with the main software of the navigation device, for performing a specific task. The plug-in file may implement (e.g. store, retrieve, control) color association and color conversion.

The user of the navigation device may control the navigation device using various buttons (not shown) or a tactile user interface such as a touch screen or touch pad or via spoken instructions. In this example, the user may interact with the navigation device using the touch screen display 2, which is also connected to the data bus 6.

The navigation device might comprise an onboard light sensor 5a or might have an interface to an external light sensor 5b. A light sensor is a specially constructed diode or transistor producing an output signal in accordance with current ambient lighting conditions. The processor 4 receives a signal indicative of ambient lighting conditions from sensors 5a or 5b. The signal from the sensor 5a or 5b is taken into account by the processor 4 for selecting and changing display settings of the navigation device. The signal indicative of ambient lighting conditions may not be taken into account immediately in order to filter sudden, temporary changes in ambient lighting conditions. A buffer between 10 seconds and 150 seconds might be used to prevent unwanted changes between display modes due to temporary changes in ambient lighting conditions.

Figure 2:
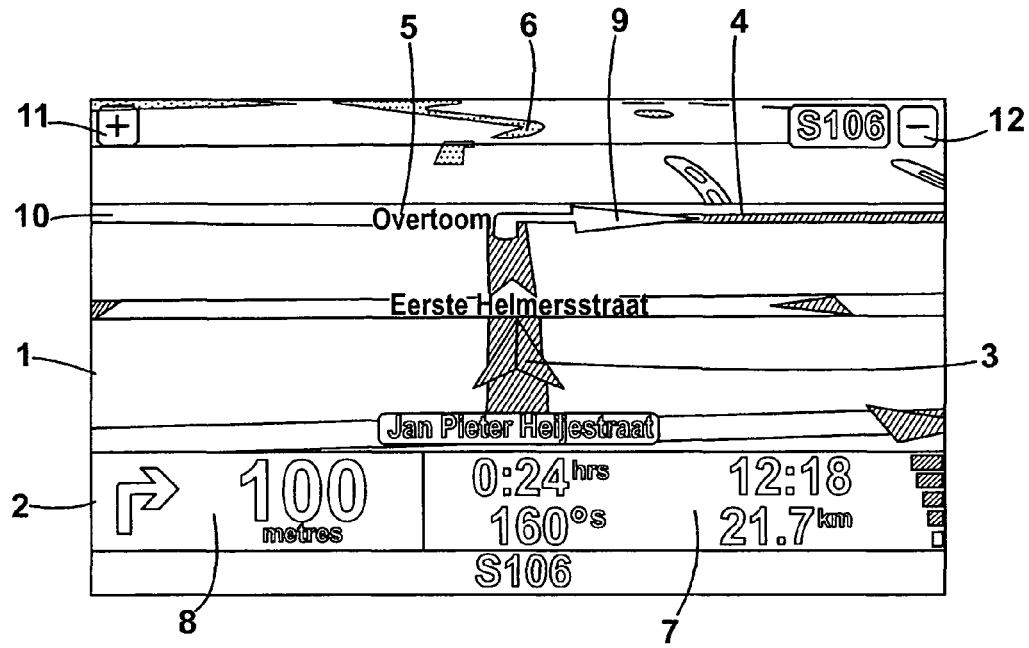
FIG. 2 is a screen shot from a navigation device; the screen shot shows a three dimensional like navigation view appropriate for daytime usage and a status bar running along the bottom of the display.

FIG. 2 is a screen shot from a personal navigation device. The screen shot shows a typical three dimensional navigation view 1 and a status bar 2 along the bottom of the screen. Roads, blocks of buildings, parks, and water areas are shown using various colors. The overall appearance is hence similar to a paper map. An arrow 3 indicating the current position of the device is shown in the center of the screen. As the user of the navigation device or a vehicle wherein the navigation device is mounted, travels along a route 4, the navigation view 1 is regularly updated by map scrolling and turning such that the arrow 3 indicating the current position remains in a center area of the screen, pointing upwards. A center area of the screen is located at the lower half of the screen; at equal distance from the left and right edge of the viewable map area. The user of the navigation device follows route 4 in order to reach a desired destination (not shown in the figure).

The status bar 2 provides information on the details of the journey in area 7. The next instruction icon 8 indicates what the next maneuver is that the user should make and how far the current location from the place of the maneuver is, so that the user has enough time to prepare for a next maneuver. The next instruction icon 8 may be accompanied by appropriately timed voice instructions played through a speaker of the navigation device or via external audio playback devices such as headphones or a car audio system.

It is to be noted that in the status bar 2, character types with appropriate size, color, and placement are used over a background of contrasting color to facilitate reading of the contents under most lighting conditions. In this example, white fonts are used over a dark blue background. Alternatively, different combinations of colors may be used providing sufficient legibility for the user of the navigation device. Such combination of colors include yellow, white, green, or light grey text over a black, dark grey, brown, or dark blue background. Optionally, text and background colors might be swapped or inverted.

Streets 5 and main roads 10 are drawn using light colors, such as white and yellow, while street names 6 are displayed in black to ensure a sufficient contrast. Further color combinations might be possible, as discussed above. The next action is also marked on the map with an arrow 9. In this example, arrow 9 is drawn in green color that remains visible when superimposed over the streets 5 and main roads 10. It is also possible to use any other color, which is different than the colors below arrow 9.

A set of colors to be used in navigation view is called a color scheme. A color scheme contains information regarding types of map elements and colors associated with them. Beside map elements, a color scheme might also contain information regarding colors to be used in the status bar 2 and colors to be used for other elements, shown in the navigation view 1, such as: zoom buttons 11 and 12; current position marker 3; street names 5; water 6; arrow 9 for next action; and any other elements on screen, also the ones not shown on FIG.

2 such as tunnels, bridges, highways, pedestrian streets, railways, private roads, service roads, roundabouts, bus lanes, etc.

It is also possible to increase the backlight of the display of the navigation device, especially when it is used under direct sunlight, and to decrease the backlight when used in a dark environment to provide good readability in various lighting conditions in addition to using various sets of colors.

Figure 3:
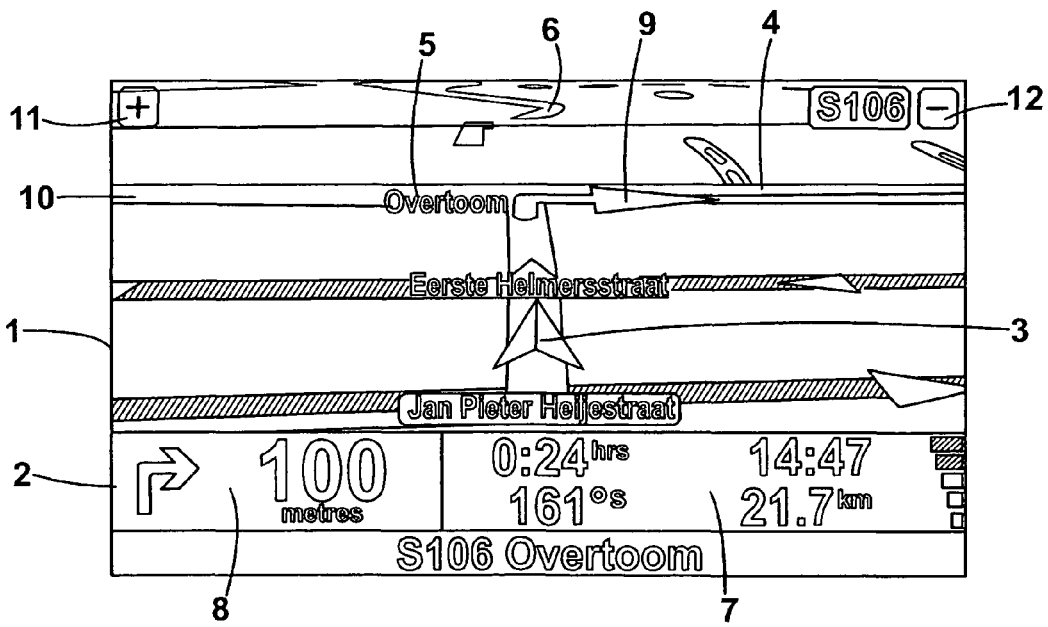
FIG. 3 is a screen shot from a navigation device; the screen shot shows a three dimensional like navigation view appropriate for nighttime usage and a status bar running along the bottom of the display.

FIG. 3 is a screen shot from a navigation device. The screen shot shows the same three dimensional navigation view 1 and status bar 2 as in FIG. 2 but using a different color scheme that is suited for dark environments, where the harsh, contrasting colors on FIG. 2 might be disturbing for the user of the navigation device. In this example, the brightest color is used to indicate the planned route 4, while the other elements are drawn using relatively dark colors. Some elements such as the river 12 shown in FIG. 2 are almost completely dissolved in the background of the image, and the greens of the park area 13 at the top edge of the screen are completely dark to represent an almost realistic nighttime view of the environment surrounding the navigation device.

It is also possible to draw a schematic representation of the night sky at the area close to the top of the screen where relevant map and routing information is not displayed. This would compensate for the loss of details compared to the view on FIG. 2. Stars on the night sky might be rendered using white, yellow or light grey colored dots of the size of 1 or 2 pixels in the upper third of the viewable area in order to create a better feeling of space even though fewer details are shown than on the view depicted on FIG. 2.

The color scheme used in FIG. 3 helps the user of the navigation device identify those elements that are more likely to be relevant during the night. Additionally, there is less variation of colors compared to FIG. 2, hence street names 6, route 4, and information 9 on next action stand out from an almost even colored background consisting of other map elements. Such a color scheme would result in a lower amount of screen flickering and less distraction to a user of the navigation device during the night while it would still allow sufficient visibility as opposed to color schemes with brighter, more varied and more vivid colors. The same or a similar color scheme might be advantageous when the user of the device enters a tunnel or other areas with considerably lower lighting conditions than during normal day use.

Figure 4:
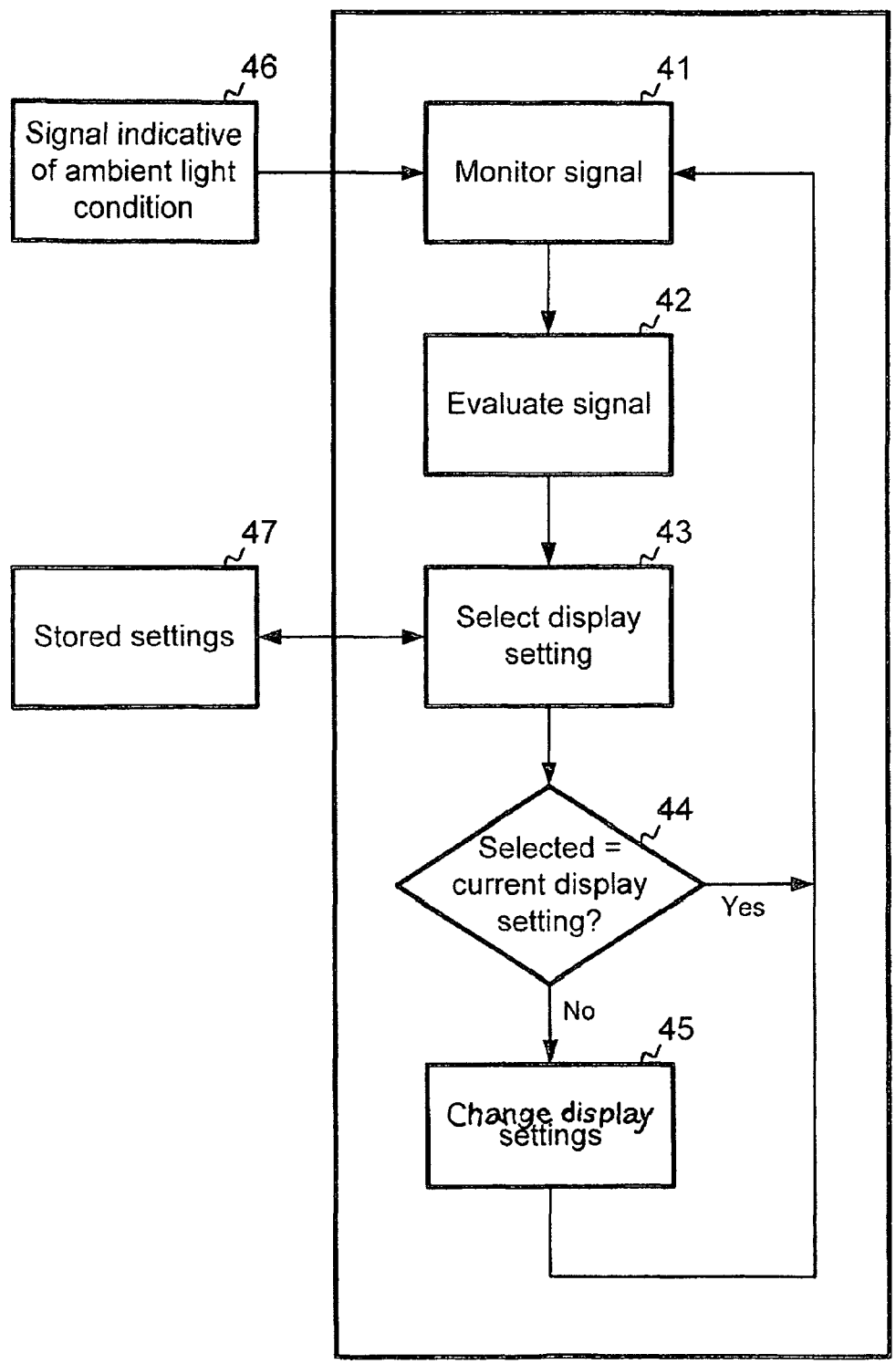
FIG. 4 is a flowchart illustrating an implementation of the invention.

FIG. 4 is a flowchart illustrating the present invention. The navigation device stores in its memory various data that is required to perform navigation related functions. The data might comprise map data, satellite data, user data, sound and text files, software for navigation and related operations, also configuration files, preference settings and operating system files. The memory can be one of a random access memory, a hard disk a flash memory, a removable memory card, and any suitable volatile or non-volatile storage means. The processor of the navigation device is connected to the memory and performs various operations as and when they are required based on programmed instructions and/or user interaction. The processor may carry out read and write operations. The processor is able to delete, move and modify data in any manner that is required for the operation of the navigation device.

In the first step of FIG. 4, the processor of the navigation device monitors for a signal indicative of ambient lighting conditions. In this embodiment, the signal is received from a light sensor mounted on a printed circuit of the navigation device.

A light sensor is a photosensitive diode or transistor producing an output signal that is a function of the amount of light impinging the surface of the diode. When the relation between the amount of light on the diode and the corresponding output signal is known, it is possible to reliably distinguish between various lighting conditions such as daylight and night or, optionally, to use a finer granularity for further distinguishing between an arbitrary number of transitional lighting conditions between daylight and night. Manufacturers of light sensors publish respective operating characteristics of diodes such as the TOSHIBA TPS851 model, which may be used in this implementation of the invention. In other implementations, it is also possible that the light sensor is coupled externally to the navigation device, and it is also possible that the sensor is only capable of distinguishing between two conditions and providing an output signal indicating one of the two conditions. Other sensors indicative of current lighting conditions might be used, such as a headlight status indicator to give a good estimation that outside light levels have decreased when the vehicle headlights are on.

In the first step, the processor of the navigation device monitors a signal indicative of current lighting conditions. In the next step, the processors performs an evaluation of the signal and then proceeds to selecting an appropriate display setting that has been allocated for the current lighting condition. The processor proceeds to changing current display settings to the selected display setting after it has determined that the current display setting differs from the setting allocated to the current lighting condition.

The allocated display setting might comprise one of the color schemes that has been discussed above, and might also comprise pre-set backlight levels, and optionally showing or hiding details on the screen.

A display setting suited for daylight conditions may comprise a screen backlight level set to a maximum value, and a color scheme using realistic day-like colors, and showing map information in a similar fashion than on paper maps.

Another display setting for use during the night may comprise a lowered backlight level which can be in the lower half of the backlight range, e.g. set to 15 percent, in combination with the same color scheme as above or another color scheme using colors that are similar to a view of the area surrounding the user at night. It is also possible that the color scheme for nighttime usage employs inverted colors of the color scheme for daytime usage.

It is also possible that a night view indicates objects that are not visible during the day, e.g. stars, streetlight, and it is also possible to configure a night view to disable some objects or functions that are more likely to be relevant during the day and enable functions that might be relevant to the user of the navigation device during the night or in dark environments. Thus, besides using a pre-defined set of colors for displaying screen contents, a day or night view might show different pieces of information, which might include at least one of a star map, points of interests, information on map items or planned route, and menu items. A day or night view might also enable or disable some functions of the navigation device, which might be at least one of a speed limit warning, a driving break warning, and updating of traffic or weather information. Therefore, when switching to a day or night view, the navigation device will retrieve information on road conditions, such as congestion or road temperatures and similar.

In the following, attention is drawn to FIGS. 4, 5, and 6 that describe various configuration options for the user of the navigation device.

Figure 5:
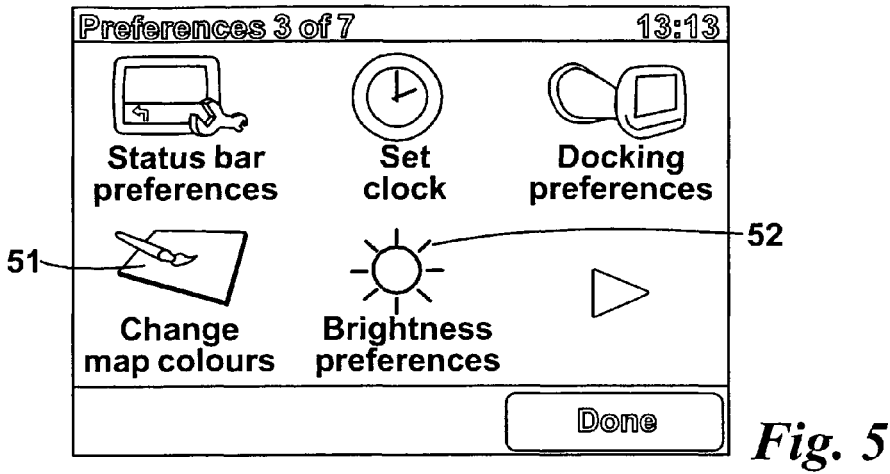
FIG. 5 is a screen shot from a navigation device, the screen shot shows a preferences screen with buttons for changing map colors and display brightness.

FIG. 5 is a screen shot from a preferences menu of a navigation device. The menu is based on various icons and text labels, each of the icons representing a different configuration option. On some navigation devices, configuration options can be reached through a menu based purely on text.

Icon 51 in the lower left hand corner is labeled "Change map colours" and by selecting it, the user of the navigation device can select map colors that are most appropriate for the current operating environment or other parameters, like the personal preference of the user. Some color schemes have been designed to create a more realistic representation of the actual view, while others are adopted for color blind persons, and still others are designed around various themes, such as the official colors of a country's national soccer team. Certain color schemes conform to regional differences in color coding of paper maps and road infrastructure objects.

It is common in color schemes of the present invention that any objects that might be displayed on the screen have an association with a color. The color associations in a color scheme might be pre-defined and fixed, or it might be possible for the user of the navigation device to select colors for individual map objects and elements displayed on the screen.

According to this embodiment of the invention, certain map colors are more suited for daytime use, and others are suited for nighttime use. The user can manually link one color scheme to daytime use and link a different color scheme to nighttime use, or the appropriate day and night color schemes can be stored as a factory preset in the memory of the navigation device. Icon 52 in the lower center area of the preferences menu opens up a brightness preferences screen that will be described in more detail in FIG. 6.

Figure 6:
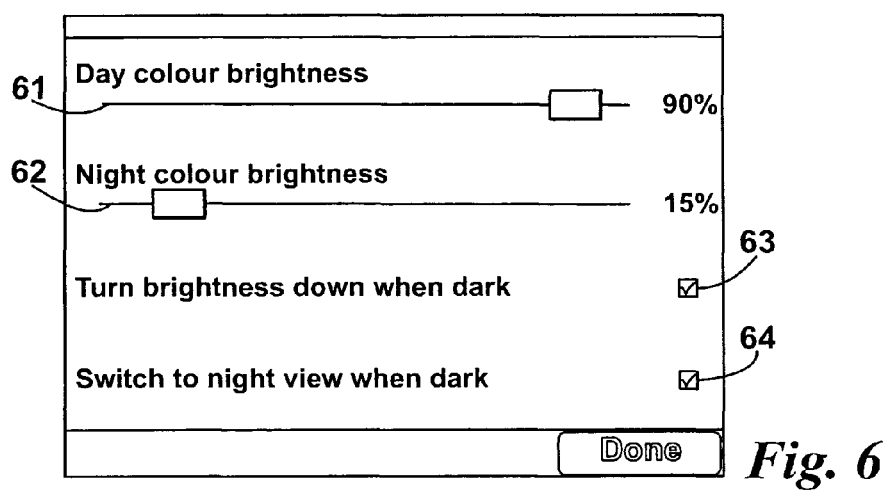
FIG. 6 is screen shot from a portable navigation device, the screen shot shows a brightness preferences screen.

FIG. 6 depicts a screen shot of a brightness preferences menu of a navigation device according to the invention. The screen shot indicates a first slider 61 for selecting a backlight level to be used during daytime, and slider 62 for selecting another backlight level to be used during nighttime. The backlight levels can be selected independently from each other or as a ratio of each other. In the example shown on FIG. 6, daytime backlight level is at 90 percent of the available range, and nighttime backlight level is at 15 percent of the range. Alternatively, the user may indicate a desired ratio, e.g. daytime brightness 90 percent of the available range, and a nighttime brightness being 15 percent of selected daytime brightness. It is also possible that the user of the navigation device wishes to use a higher backlight level during the night than during the day. It is possible by setting sliders 61 and 62 accordingly.

On the lower part of FIG. 6, checkboxes 63 and 64 have been indicated. Checkbox 63 is marked when the user wishes to rely on the navigation device to adjust backlight of the display between the two levels as may be selected by sliders 61 and 62. When checkbox 63 is deselected, the user will be able to set backlight levels manually. Checkbox 64 is marked when the user of the navigation device wishes to rely on the navigation device to switch between day and night color schemes according to a mechanism illustrated in FIGS. 8 and 9. When the user deselects checkbox 64, the navigation device keeps using the current color scheme independently of the lighting conditions.

Figure 7:
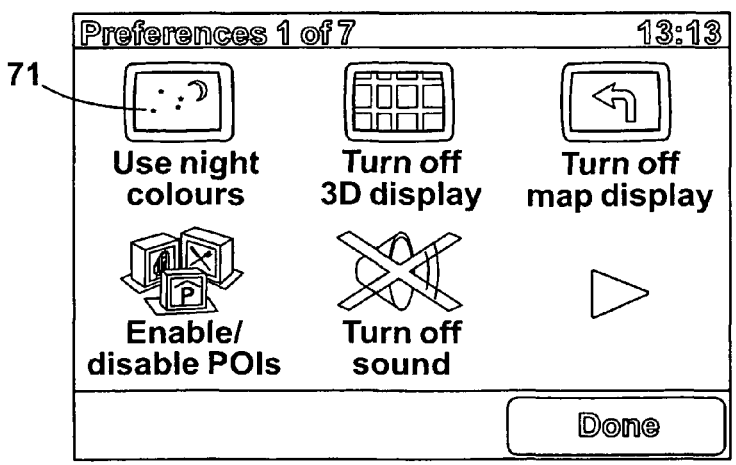
FIG. 7 is a screen shot from a portable navigation device, the screen shot shows a preferences screen with a button to manually switch between day and night views.

FIG. 7 illustrates the configuration menu of a navigational device, wherein the user can manually switch between day and night colors using button 71. When a nighttime display setting is selected by pressing this button, checkboxes 63 and 64 (of FIG. 6) will not be taken into account by the navigation device.

Figure 8:
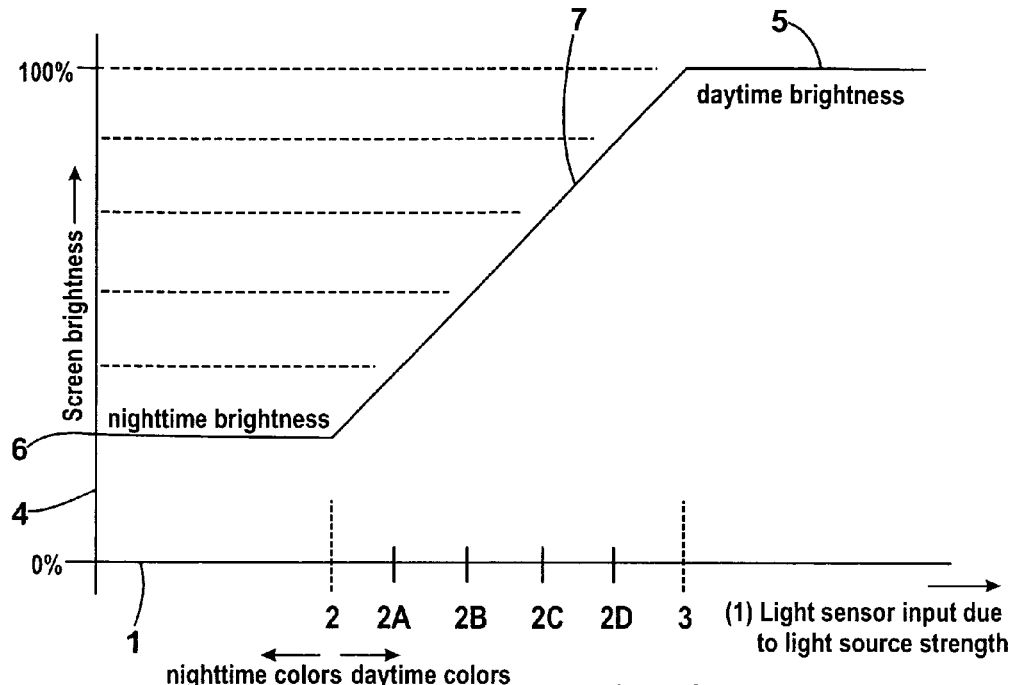
FIG. 8 is a diagram for transition between day and night views according to one embodiment of the invention.

FIG. 8 is a transition diagram illustrating various display settings of the navigation device in response to different lighting conditions. The horizontal axis 1 represents the level of the input signal received from a light sensor. When the input signal indicates low ambient lighting conditions, i.e. the input is below a threshold 2, the navigation device uses a night color scheme and a nighttime display setting. When the input from the light sensor indicates daytime lighting conditions, i.e. signal level is higher than threshold 2, the navigation device uses a day color scheme and a daytime display setting. Threshold 2 has been set to a value corresponding to an ambient light level, below which the average user would be using a night color scheme. Threshold 2 can be factory preset or it can be set by the users of the navigation device according to their personal preferences.

The vertical axis 4 represents the screen brightness between 0 to 100 percents. In this example, daytime brightness 5 is set to 100 percent, and nighttime brightness 6 is set to approximately 25 percent. Nighttime brightness 6 is used as long as the light sensor input is below threshold 2, and daytime brightness 5 is used when the light sensor input is above threshold 3.

In another embodiment, threshold 2 and threshold 3 are identical, i.e. co-located at a point on horizontal axis 1. In this case, the display settings instantly change from nighttime brightness to daytime brightness when the signal indicative of ambient lighting conditions rises above the combined threshold 2 and 3. Similarly, when the signal indicative of ambient lighting conditions falls below the combined threshold 2 and 3, display settings instantly change from daytime brightness to nighttime brightness.

FIG. 8 depicts a smooth transition along line 7 between levels for nighttime brightness 6 and daytime brightness 5 while the light sensor input is between threshold 2 and threshold 3 that are set to different values of the horizontal axis 1. In this case, further display settings might be allocated to different parts of the transition line 7. The further display settings might be created using daytime color schemes and gradually changing backlight levels; or nighttime color schemes and gradually changing backlight levels.

In the preferred implementation, 5 different backlight levels are allocated evenly between the levels for nighttime brightness 6 and daytime brightness 5, without changing the color scheme. This arrangement provides a gradual dimming of display backlight in response to the decreasing ambient light levels. In this example, four points 2A, 2B, 2Q and 2D are shown on the horizontal axis 1 between threshold 2 and threshold 3. There might be a different number of points, the points might be placed arbitrarily between thresholds 2 and 3 or they may be evenly distributed.

When the signal indicative of ambient lighting conditions falls to threshold 3 on the horizontal axis 1, screen brightness is decreased to a value associated with threshold 2D, which lays proportionally between the value of daytime brightness 5 and nighttime brightness 6 (in this example, 100 and 25 percents respectively). Screen brightness remains at the value associated with threshold 2D until the decreasing signal actually reaches threshold 2D. At threshold 2D, screen brightness changes to the value associated with threshold 2C; and screen brightness remains unchanged until the decreasing signal actually reaches threshold 2C Similarly, at threshold 2C, screen brightness changes to the value associated with threshold 2B; and at threshold 2B, screen brightness changes to the value associated with threshold 2A Finally, at threshold 2A, screen brightness changes to the value associated with threshold 2, which is the value of nighttime brightness 6; and screen brightness remains unchanged as long as the signal is below threshold 2. Changing from daytime colors to nighttime colors can occur at one of thresholds 2, 2A, 2B, 2C, 2D, and 3, depending on factory or user configuration.

Similarly, when the signal level on the horizontal axis 1 rises in response to increasing ambient light levels, the navigation device is configured to change from nighttime color schemes to daytime color schemes at threshold 2, and to gradually increase display backlight from nighttime brightness level to daytime brightness level along line 7 until light sensor input indicative of ambient lighting conditions reaches threshold 3. The detailed procedure is the following.

Screen brightness remains at the level of nighttime brightness 6 as long as the signal indicative of ambient lighting conditions is below point 2A, or alternatively threshold 2. When a raising signal reaches threshold 2A, screen brightness changes to a level allocated to this given point, which is a proportional value and can be read from the vertical axis 2, somewhere between nighttime brightness 6 and daytime brightness 5 (in this example, 25 and 100 percents respectively). At threshold 2B, screen brightness increases to a level allocated to this given point and thereafter it remains unchanged until the signal reaches threshold 2G Screen brightness keeps changing in a similar manner at thresholds 2C and 2D. Finally, at and above threshold 3, daytime brightness 5 is used, which is equal to 100 percent in this example.

In the above examples, there are four transition points between nighttime brightness 6 and daytime brightness 5, providing a good granularity without the need to store a high number of settings. In other implementations, any larger or smaller number of transitional steps can be used or there can be a step less, continuous transition as well.

Above threshold 3, daytime display settings are used unless the user of the navigation device manually selects a different display setting, e.g. by pressing button 1 on FIG. 7 to use night colors, or by disabling checkboxes 3 and 4 on FIG. 6. In other implementations, different configuration options might be available for manually disabling the switching between day and night color schemes. The user might simply select the same color scheme and same backlight level for daytime and nighttime usage in order to disable any automatic change.

Figure 9:
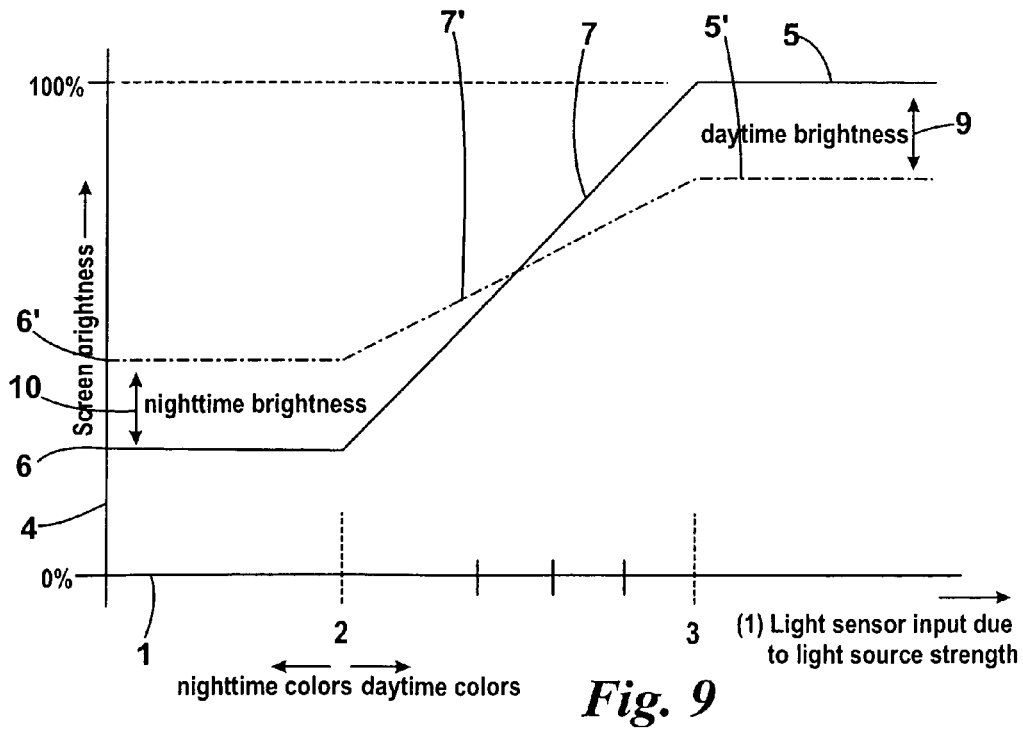
FIG. 9 is a diagram for transition between day and night views according to another embodiment of the invention.

FIG. 9 indicates an altered transition diagram compared to FIG. 8. On FIG. 9, the level of daytime brightness 5 has been lowered to a new daytime brightness 5', the difference is indicated by arrow 9. Nighttime brightness 6 has been changed to a new nighttime brightness 6', the difference is indicated by arrow 10. The new configuration can be compared to the previously discussed transition line 7 as seen on new transition line 7'. Using new transition line 7', the steps between new nighttime brightness 6' and new daytime brightness 5' are smaller but the transition is still a smooth, gradual one as long as threshold 2 and 3 are not the same.

In the above examples, ambient lighting conditions are measured using a light sensor coupled to the processor of the navigation device. The light sensor can be an integral part of the navigation device or it may be an external sensor attached to a suitable connector of the navigation device or its docking unit.

In other arrangements, the external sensor might transmit radio signals such as Bluetooth or Infra-Red signals indicative of ambient lighting conditions. For example, a radio signal transmitter might be directly or indirectly connected to an in-vehicle light sensor or headlight sensor and configured to transmit radio signals to the navigation device, the signals being indicative of ambient lighting conditions. The proper installation of a Bluetooth or Infra-Red transmitter unit is known to a person skilled in the art and it is outside the scope of the invention. A Bluetooth or Infra-Red enabled navigation device may monitor radio signals indicative of ambient lighting conditions and implement the invention according to the appended claims.

In the absence of a signal from a light sensor or a similar hardware component, or in addition to it, the software on the navigation device may also monitor the current position of the navigation device and compare it to the map data for the purposes set out above. By matching map data to current position, the software of the navigation device may indicate that the current position is in a tunnel or in an underground car park which is interpreted as a signal indicative of low ambient lighting conditions. Lack of position data (i.e. loss of GPS signal) might also indicate that the current location is in a tunnel or underground car park.

In that case, indication of ambient lighting conditions does not require a hardware component implemented on or coupled to the navigation device. The signal indicative of lighting conditions can be generated using software means such as at least one of a map data, user data, time data and configuration data.

In a further embodiment, the navigation device might ask for a confirmation from the user before or after changing between day and night color schemes upon determination that current display setting is not the display setting allocated to current ambient lighting conditions. A selection screen or a confirmation dialog may be presented to the user of the navigation device for changing display settings.

When the navigation device is removed from the vehicle, i.e. when it is detected that the device has been undocked, the user may select further options, which comprise at least one of a confirmation of undocking, a selection whether or not to monitor a signal indicative of lighting conditions, selection of color scheme to be used, and selection of backlight level to be used. A similar selection is possible when docking the navigation device in the vehicle.

The invention has been described with reference to certain preferred embodiments. It will be understood, however, that modifications and variations are possible within the scope of the appended claims.

What is claimed is:

1. A portable navigation device, comprising:
    a display;
    an input device;
    memory arranged to store display settings of the display for at least two ambient lighting conditions, each said display setting comprising a color scheme to be used in a navigation view of the navigation device and a brightness setting, wherein a first display setting is suited for conditions and a second display setting is suited for nighttime conditions; and
    a processor arranged to:
    monitor and evaluate a signal indicative of a current ambient lighting condition, said signal being at least one of: a signal from a light sensor; and time data;
    select the stored display setting for the current ambient lighting condition;
    determine if a current display setting is the selected display setting; and
    automatically change said current display setting to said selected display setting, if said current display setting is not said selected display setting;
    wherein a first display setting of the stored display settings comprises a daytime brightness setting and a second display setting of the stored display settings comprises a nighttime brightness setting, the daytime brightness setting and the nighttime brightness setting being based on a received portable navigation by a user on the portable navigation device, comprising a selection of a brightness level to be used during daytime and a selection of another brightness level to be used during nighttime, wherein the selection of the daytime brightness level and the selection of the nighttime brightness level are made independently from or as a ratio of each other.

2. The portable navigation device according to claim 1, wherein the color scheme arranged by the processor aids in identifying elements that are more relevant to a user at night.

3. The portable navigation device according to claim 1, wherein the processor is further arranged to cause the display to smoothly transition from the daytime brightness level and the nighttime brightness level when a light sensor input level is between a first threshold and a second threshold.

4. The portable navigation device according to claim 1, a first display setting of the stored display settings comprises a daytime brightness setting and a second display setting of the stored display settings comprises a nighttime brightness setting, 4 transition points between the nighttime brightness level and the daytime brightness level.

5. The portable navigation device according to claim 1, wherein said display settings selected by the processor for said at least one ambient lighting conditions comprise at least one of an appropriate view, and a color scheme.

6. The portable navigation device according to claim 5, wherein the color scheme arranged by the processor includes a schematic representation of the sky during daytime or nighttime depending on whether the current ambient lighting condition is light or dark.

7. The portable navigation device according to claim 5, wherein said color scheme arranged by the processor is stored as a plugin.

8. The portable navigation device according to claim 1, wherein said display setting comprises a color scheme arranged by the processor that uses brighter colors and the brightness level is relatively high when the current ambient lighting condition is light.

9. The portable navigation device according to claim 1, said display setting comprises a color scheme arranged by the processor that uses darker colors and the brightness level is relatively low when the current ambient lighting condition is dark.

10. The portable navigation device according to claim 1, wherein the processor is further arranged to change said current daytime brightness setting or said nighttime brightness setting by gradually changing backlight levels from a current backlight level to an allocated and stored backlight level.

11. The portable navigation device according to claim 10, wherein the gradual change of backlight levels arranged by the processor comprises a predefined number of incremental jumps ranging from the current backlight level the stored backlight level.

12. The portable navigation device according to claim 11, wherein the predefined number is five.

13. The portable navigation device according to claim 1, wherein the processor is further arranged to cause the portable navigation device to buffer said signal from a light sensor.

14. The portable navigation device according to claim 13, wherein said light sensor is located on a printed circuit board of said navigation unit.

15. The portable navigation device according to claim 1, wherein said signal indicative of ambient lighting conditions comprises a signal received from a headlight sensor.

16. The portable navigation device according to claim 15, wherein said headlight sensor is wired to said navigation device directly or through its docking unit.

17. The portable navigation device according to claim 16, wherein the processor is further arranged to cause the portable navigation device to ask confirmation from the user when docking/undocking said navigation device.

18. The portable navigation device according to claim 15, wherein said headlight sensor is wirelessly connected to said navigation device.

19. The portable navigation device according to claim 1, wherein the processor is further arranged to enable or disable at least one function of said navigation device when changing display setting.

20. The portable navigation device according to claim 19, wherein said at least one function comprises one of a star map, points of interests, information relating to map items or a planned route, warning about speed limits, warning about driving breaks, displaying traffic information, displaying weather information, menu items, and menu color schemes.

* * * * *